United States Patent [19]

Costin

[11] 4,052,339

[45] Oct. 4, 1977

[54] REFRACTORIES AND METHODS OF MAKING SAME

[75] Inventor: Darryl J. Costin, Columbus, Ohio

[73] Assignee: Owens-Corning Fiberglas Corporation, Toledo, Ohio

[21] Appl. No.: 477,705

[22] Filed: June 10, 1974

[51] Int. Cl.$^2$ .......................... H01B 1/02; H01C 1/02
[52] U.S. Cl. .................................. 252/512; 252/513; 252/519; 13/35; 252/520; 252/521; 252/518
[58] Field of Search ............... 252/512, 513, 514, 519, 252/520, 521, 518; 13/35; 106/57, 55, 66

[56] References Cited

U.S. PATENT DOCUMENTS

| 2,156,608 | 5/1939 | Schon et al. ............................ 13/35 |
| 3,185,652 | 5/1965 | Kleber et al. ........................ 106/55 |
| 3,284,217 | 11/1966 | Walther, Jr. ......................... 106/66 |
| 3,309,209 | 3/1967 | Martinet et al. ...................... 106/66 |
| 3,425,851 | 2/1969 | Plumat et al. ......................... 106/66 |
| 3,427,390 | 2/1969 | Renkey et al. ......................... 13/35 |
| 3,652,304 | 3/1972 | Daniels .................................. 106/57 |

Primary Examiner—Benjamin R. Padgett
Assistant Examiner—Josephine Lloyd
Attorney, Agent, or Firm—John W. Overman; William P. Hickey

[57] ABSTRACT

It has been discovered that refractories at their elevated use temperatures have electrical properties unique to semi-conductors. The electrical conductivity of refractories is changed by altering the defects in the metallic or nonmetallic ions of the refractory lattice, and the purity is controlled to prevent fluxing from occurring at the grain boundaries. The discovery makes possible either the increase or decrease in electrical conductivity of any semi-conducting refractory, since the theory is applicable to both materials wherein the defects occur in the metal ions of the refractory lattice and also to materials wherein the defects occur in the nonmetallic ions of the refractory lattice.

22 Claims, 3 Drawing Figures

REFRACTORIES AND METHODS OF MAKING SAME

BACKGROUND OF THE INVENTION

The present invention relates to new and improved refractories, to electrically heated furnaces containing the same, and to methods of making the improved refractories.

Refractories are used for lining the internal heated chambers of furnaces that are used to heat materials, and in many instances the refractories must have particular properties to withstand the reactivity of the materials being heated and/or the furnace atmosphere. Problems exist, for example, in electrical furnaces that are used to melt glass, because the glass has a fluxing action on many types of refractories, and because the refractories which are resistant to the fluxing action have an electrical conductivity that is greater than that of the molten glass. Similar problems exist in other types of furnaces, so that in many instances there is a need for refractories which have a higher electrical resistance than do the prior art refractories. In still other instances, refractories are used as the electrodes which contact the molten glass, and in these instances, a need exist for increasing the electrical conductivity of the refractory of the electrodes so as to prolong their life. Still other applications exist where a benefit can be derived by increasing or decreasing the electrical conductivity of the refractories used therein.

According to the present invention, it has been discovered that the electrical conductivity of a refractory can be increased or decreased without appreciably effecting the ability of the refractory material to withstand attack by the materials which the refractory contains. As for example, the conductivity of pure chromic oxide at the fusion temperature of molten glass is greater than that of the molten glass, and it has been discovered that the lattice structure of the chromic oxide refractory can be changed to cause the chromic oxide to have an appreciably greater electrical resistance to thereby decrease the power drain or loss of electrical energy from an electrically heated glass melting furnace. This is accomplished by diffusing a dopant into the lattice structure of essentially pure particles of chromic oxide to decrease the amount of electron carriers in the lattice structure that is available for carrying electric current.

According to the invention it has been discovered that refractories, which at room temperature behave as insulators, exhibit appreciable semi-conductivity at the elevated use temperatures of the furnaces wherein they are installed.

If a dopant is used having an atomic radius of approximately the same atomic radius as the metal atoms in the crystal lattice of the refractory particles, it can diffuse into the lattice without forming deposits at the grain boundaries between the particles. By controlling the purity of the lattice structure so that it only contains the dopant desired, and by eliminating fluxing materials at the grain boundaries, a body is produced having changed electrical conductivity at elevated temperatures. It has been found, for example, that when a mixture of basically pure particles of chromic oxide and a small amount of titanium oxide are sintered, that the electrical resistivity of the resulting refractory is appreciably increased so that electrical furnaces for melting glass now are a commercial possibility. It has been found, that the amount of the dopant that is used must not be appreciably in excess of that which will diffuse into the crystalline lattice of the refractory particles, and that this amount generally corresponds to the solubility of the dopant in the refractory particles at the use temperature.

Most of the prior art refractories with which I am aware have used sintering aids, sometimes called shrinking agents, or fluxing materials, to either lower the sintering temperature, or increase the density of the refractory produced. According to the invention it has been found that these sintering aids are not only detrimental, but that they prevent the synergistic effect of the present invention from taking place. The effect of impurities, therefore, with respect to the materials of the present invention is critical, and the amounts of undesired impurities must be held within very narrow limits.

Because it has been discovered that refractories are semi-conductors at their elevated use temperature, the following theory has proven beneficial. Electrical conductivity of p-type semi-conductors occurs by reason of defects in the metal atoms of the lattice, and in the case of chromic oxide refractory, these defects are negative triple ionized chromium vacancies and will hereinafter be designated $V_{Cr}'''$. Since oxygen is the other lattice material, the oxygen in the lattice will be controlled by the crystal-vapor equilibrium wherein:

$$3/2\, O_2 \rightleftharpoons 2(V_{Cr}''') + 3O_o + 6h$$

where:
$O_o$ represents oxygen at an oxygen site; and
$h$ represents positive holes.

The equilibrium constant for the above equation, therefore, becomes:

$$K = \frac{[V_{Cr}''']^2 p^6}{p_{O_2}^{3/2}}$$

where:
$p_{O_2}$ is the partial pressure of oxygen;
$p$ is the concentration of positive holes; and
[ ] denotes concentration of the defect.

For constant $p_{O_2}$, then $K' = [V_{Cr}''']^2 p^6$. When the pure $Cr_2O_3$ lattice is doped with a foreign atom of higher valence than $Cr^{+++}$, for example, $Ti^{++++}$, the electrical neutrality condition is given by:

$$n + 3[V_{Cr}'''] = p + 2[V_O^{++}] + [Ti_{Cr}^+]$$

where:
$n$ is the concentration of electrons;
$[V_O^{++}]$ is the concentration of positive double ionized oxygen vacancies; and
$[Ti_{Cr}^+]$ is the concentration of the dopant, Ti, positively charged located on a Cr site.

Employing Browers Method of Aproximation for the electrical neutrality condition, the modified equation becomes:

$$3[V_{Cr}'''] \times p + [Ti_{Cr}^+]$$

since $K' = [V_{Cr}''']^2 p^6$

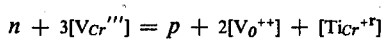

then $K' = \left(\dfrac{p + [Ti_{Cr}^+]}{3}\right)^2 p^6$

It can readily be seen that as the concentration of the dopant [$Ti_{Cr}^+$] increases, $p$ must decrease in order to maintain a constant $K'$. Since the electrical conductivity is directly proportional to $p$, the electrical conductivity of p-type $Cr_2O_3$ refractory is decreased when dopant additions like $T_i^{++++}$ exhibiting a higher valence than the base metal $Cr^{+++}$ are used.

What has been said for titanium will occur with any material having a higher valence than $Cr^{+++}$ provided that these materials have an atomic radius sufficiently similar to that of the chromium so that it can diffuse into the chromic oxide lattice. What is more, the above theory will hold true for any p-type semi-conductor material. In the case of chromium, therefore, the following materials can be used as dopants to increase the electrical resistance of the chromic oxide refractory: titanium, zirconium, hafnium, vanadium, niobium, tantalum, molybdenum, wolfram, ruthenium, osmium, iridium, silicon, germanium, and tin. Silicon, germanium, and tin are Group IV elements: titanium, zirconium, and hafnium are Group IVa elements; vanadium, niobium, and tantalum are Group Va elements; molybdenum and wolfram are Group VIa elements; and ruthenium, osmium, and iridium are Group VIII elements.

For the case where it is desired to increase the conductivity of a p-type refractory, the following theory applies. The electrical neutrality condition is satisfied when:

$$n + 3[V_{Cr}'''][Mg_{Cr}'] = p + 2[V_o^{++}]$$

where:
$n$ is the concentration of electrons;
[$Mg_{Cr}'$] is the concentration of the dopant Mg negatively charged located in Cr sites; and
[$V_o^{++}$] is the concentration of positive double ionized oxygen vacancies.

By using Brower's Method of Approximation:

$$3[V_{Cr}'''] + [Mg_{Cr}'] = p$$

$$\text{and } [V_{Cr}'''] = \frac{(p - [Mg_{Cr}'])}{3}$$

$$\text{since } K' = [V_{Cr}''']^2 p^6$$

$$\text{then } K' = \left(\frac{p - [Mg_{Cr}']}{3}\right)^2 p^6$$

This equation shows that as the dopant concentration increases, $p$ (the positive holes) must increase in order to maintain a constant $K'$. The electrical conductivity of all p-type refractories, therefore, is increased with additions of dopants exhibiting a lower valance than the metal of the lattice.

In n-type refractories electrical conduction occurs principally by reason of ionic defects in the oxygen or negative element of the refractory lattice. The predominant ionic defect, therefore, will be designated $V_o^{++}$. The crystal equilibrium equation is:

$$\tfrac{1}{2}O_2 + V_o^{++} + 2e' \rightleftarrows O_o$$

where: $e$ represents electrons.
The equilibrium constant for the above equation is:

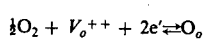

where:

$n$ is the concentration of electrons;
[$V_o^{++}$] is the concentration of positive double ionized oxygen vacancies; and
for constant $p_{o_2}$ $$K' = [V_o^{++}]n^2$$

Let X be the positive element (+3 valance) of the lattice, and let Mg be the dopant. The electrical neutrality condition is satisfied when:

$$n + 3[V_x'''] + [Mg_x] = p + 2[V_o^{++}]$$

By Brower's Method of Approximation:

$$n + [Mg_x'] = 2[V_o^{++}]$$
$$\text{and } [V_o^{++}] = \frac{n + [Mg_x']}{2}$$

$$\text{since } K' = [V_o^{++}]n^2$$

$$\text{then } K' = \left(\frac{n + [Mg_x']}{2}\right)^{n^2}$$

This equation shows that as the dopant concentration increases, $n$ must decrease in order to maintain a constant $K'$. For n-type refractories, therefore, the electrical conductivity decreases with additions of dopants, such as $Mg^{++}$, exhibiting a lower valance than the metal of the refractory lattice.

When n-type refractories are doped with materials, designated $Ti^{++++}$, such as titanium, having a valance greater than the metal "X" of the refractory lattice, the equation for the electrical neutrality condition is:

$$n + 3[V_x^{++}] + p + 2[V_o^{++} + Ti_x^+]$$

By Brower's Method of Approximation:

$$n = 2[V_o^{++}] + [Ti_x^+]$$

$$\text{or } [V_o^{++}] = \frac{n - [Ti_x^+]}{2}$$

$$\text{since } K' = [V_o^{++}]n^2$$

$$\text{then } K' = \left(\frac{n - [Ti_x^+]}{2}\right)^{n^2}$$

This equation shows that as the dopant concentration increases, $n$ must decrease in order to maintain a constant $K'$. For n-type refractories, therefore, the electrical conductivity increases with additions of dopants, such as $Ti^{++++}$ which exhibit a higher valance than the metal of the refractory lattice.

The present invention has confirmed that refractories do in fact operate, at least qualitatively, in accordance with the above theory, and that it is possible to either increase the electrical conductivity, or decrease the electrical conductivity, of either p-type refractories or n-type refractories. This is believed to be a highly significant discovery having wide applicaton in the refractory art.

DESCRIPTION OF THE PREFERRED EMBODIMENTS

EXAMPLE 1

Figure 1:
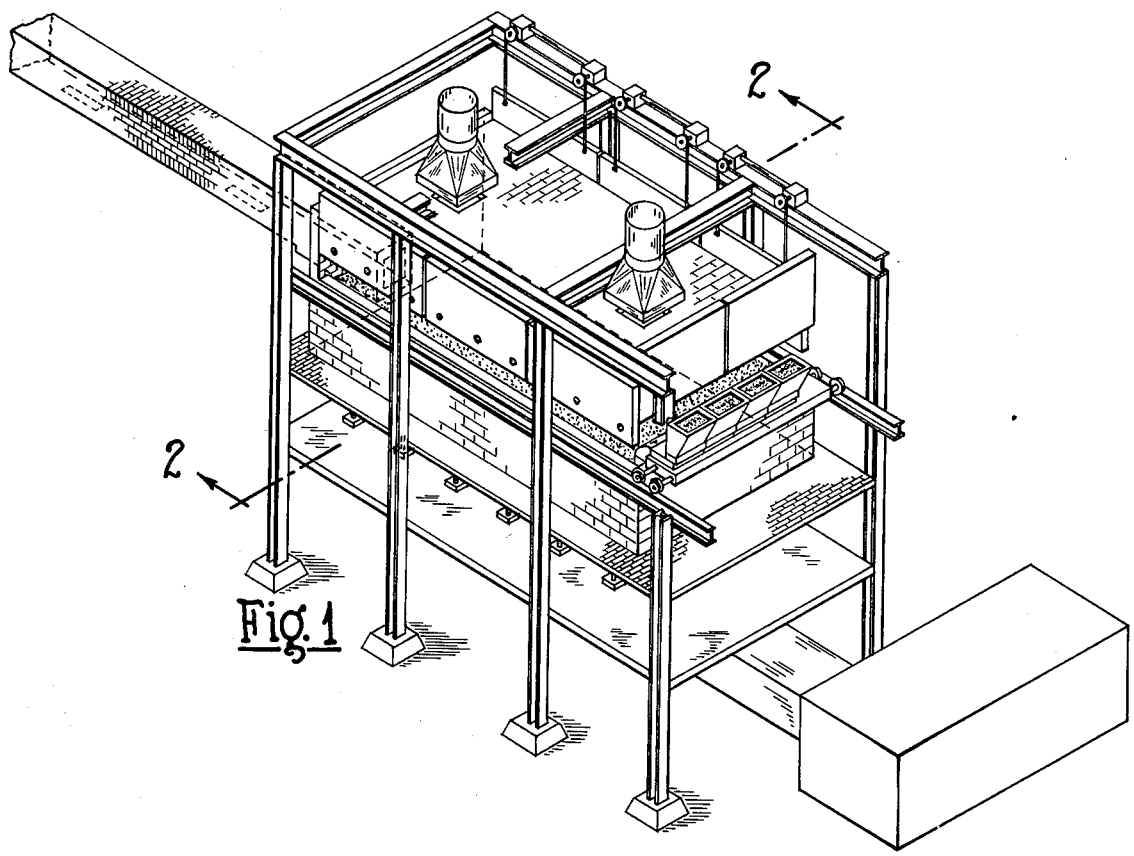
FIG. 1 is an isometric view of an electrically heated glass melting furnace.

This example shows the improvement which can be had with but a small amount of dopant, provided that the refractory lattice is essentially pure.

A mixture is made of powders having a particle size of approximately 1 micron, which mixture consists of: 99.5% of a $Cr_2O_3$ material having a purity of 99.9%, and 0.5% of titanium dioxide also having a purity of 99.9%. The powders are thoroughly mixed following which a slip is made by pouring the powders into sufficient toluene to produce a mixture wherein the toluene comprises approximately 20% by volume. This material is poured into a 1 × 6 inches mold made of plaster of Paris, and dried, first at room temperature, and then in an oven at 300° F. Thereafter the material is placed in a kiln and the kiln slowly brought up to a temperature, over a period of 24 hours, until it reaches a temperature of 1600° C. It is held at this temperature for 24 hours. The sample is then allowed to furnace cool, following which it is cut into 1-inch cubes for testing. J-alloy platinum powder is dusted onto opposite surfaces of the cube. Sheets of J-alloy foil are then placed on top of the powder, and individual platinum wires are welded to the respective J-alloy foils. The specimen is then placed in a furnace and the temperature raised sufficiently to fuse the J-alloy. Thereafter the specimen is removed from the furnace and the excess foil is trimmed from the 1-inch square end faces of the cube. A ¼inch hole is drilled sideways through the cube midway between the foil layers, and a thermocouple is placed therein. Platinum wire extensions are connected to the two platinum wire leads. The specimen is placed in a furnace, and conductivity measurements are made using a Wheatstone Bride at various recorded thermocouple temperatures. The conductivity of the cube is given in Table 1 opposite the sample notation of EX.1.

By way of comparison, the procedure of above was repeated excepting that a specimen was made of essentially pure $Cr_2O_3$ powder without the .5% dopant being added. The electrical conductivity of this pure sample is indicated under the sample notation Pure $Cr_2O_3$.

EXAMPLE 2

The process of Example 1 is repeated excepting that 0.5% of MgO powder, 99.9% pure, is substituted for the $TiO_2$ dopant. The electrical conductivity of this specimen is indicated in Table 1 opposite the sample notation EX.2.

EXAMPLE 3

The process of Example 1 was repeated excepting that the blend of powders used to make the specimen contains 2.7% by weight of $TiO_2$. This specimen gives an electrical conductivity reduction that is approximately 3 times that achieved by reason of the 0.5% $TiO_2$ dopant of Example 1.

EXAMPLE 4

The process of Example 1 is repeated excepting that the mixture of powders contains 5.2 weight percent of $TiO_2$. The electrical conductivity of this material has an increase in resistance approximately 5 times that provided by the 0.5% $TiO_2$ dopant of Example 1.

EXAMPLE 5

The process of Example 1 is repeated excepting that the mixture of powders used contains 5.0 weight percent of $Nb_2O_5$ the purity of which is 99.9%, and 95.0 weight percent of $Cr_2O_3$ the purity of which is 99.9%. The specimen of this example has an electrical conductivity approximately that the material of Example 4.

EXAMPLE 6

The process of Example 5 is repeated excepting that 5% by weight of $Ta_2O_5$ is used. This material has an increase in electrical resistance comparable to that of the material of Example 5.

EXAMPLE 7

The process of Example 1 is repeated excepting that the mixture of powders used consists of 96% by weight of $SnO_2$ the purity of which is 99.9%, and 4% by weight of $Nb_2O_5$. The electrical conductivity is more than approximately 10% greater than that of a prior art material having the following formulation: 97% $SnO_2$, 1% CuO, 1% $UO_3$, and 1% $Sb_2O_3$.

TABLE I

| Electrical Conductivity of the Refractory Bricks (Mho/meter) | | | | | |
| --- | --- | --- | --- | --- | --- |
| Sample | 2200° F | 2300° F | 2400° F | 2500° F | 2600° F |
| Pure $Cr_2O_3$ | 5.26 | 5.41 | 5.78 | 6.25 | 6.90 |
| EX. 1 | 1.84 | 2.56 | 3.55 | 4.54 | 5.81 |
| EX. 2 | 13.51 | 13.33 | 13.16 | 12.99 | 12.82 |
| E glass | 0.36 | 0.66 | 1.14 | 1.89 | 2.60 |

FIG. 1 is an isometric view of an electrically heated glass melting furnace whose temperature is maintained by a flow of electricity through the molten glass.

Figure 2:
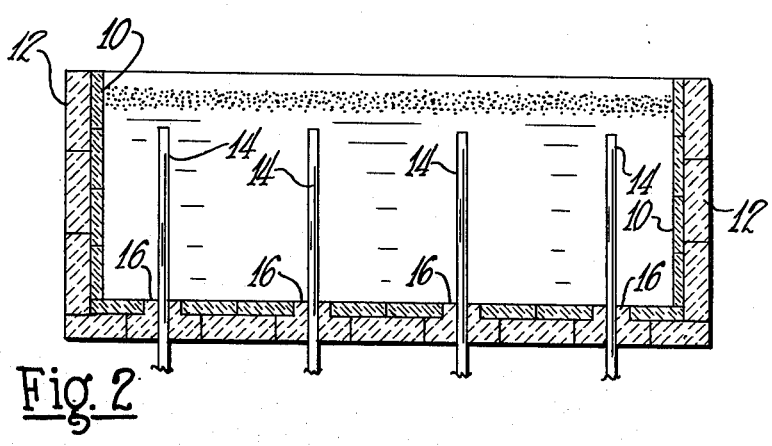
FIG. 2 is a fragmentary cross-section taken through the brickwork on approximately the line 2—2 of FIG. 1.

FIG. 2 is a fragmentary cross section taken through the brick work on approximately the line 2—2 of FIG. 1. In FIG. 2 numeral 10 shows a layer of brick made of the composition given in Example 4. This brick is approximately 6 inches thick. Numeral 12 indicates a back-up layer of Harbison-Walker Superduty Fire Clay Brick approximately 12 inches thick. The electrodes 14 are formed from slip cast rods made of a material having the formulation of that of Example 7. These rods extend up through annular slip cast insulators 16, that are made of Harbison-Walker Corundum. The chrome brick work, has a conductivity that is slightly less than that of the E-glass that is melted in the furnace, and the electrode has a conductivity appreciably greater than that of the prior art essentially pure $SnO_2$ electrodes previously used.

Figure 3:
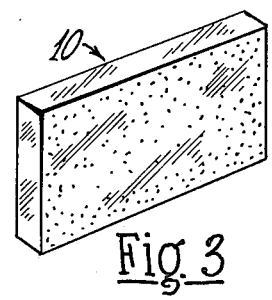
FIG. 3 is a chrome brick with a dopant applied to the inner face of the brick before firing.

FIG. 3 of the drawings shows a chrome brick similar to that previously described, excepting that a dopant was applied to the inner face of the brick only before firing, so that only the inner surface of the brick that is in contact with the molten glass has the higher electrical resistance. This can be substituted for the brick previously described.

It can now be seen that the principles of the present invention can be used to either raise or lower the conductivity of refractories without changing their resistance to attack by other materials. It will further be understood that the principles of the present invention are not limited to refractories having oxide lattices, and that they will also apply to carbide refractories, nitride refractories, sulfide refractories, boride refractories, silicate refractories, etc. for use in atmospheres wherein such materials are compatible. Examples of other refractory materials will include: SiC, AlP, AlAs, GaP, AlSp, GaAs, InP, GaSb, InAs, InAb, alumina zircon, etc..

A list of materials which can be used as dopants to increase the conductivity of chromic oxide is as follows: lithium, magnesium, manganese, iron, cobalt, nickel, copper, and zinc. Lithium is a Group I element; copper is a Group Ia element; zinc is a Group IIa element; magnesium is a Group II element; manganese is a Group VIIa element; and iron, cobalt, and nickel are Group VIII elements.

In general, the dopants should not be used in amounts over their solubility limit in the refractory lattice at use temperature. Amounts which are effective will usually be between 0.5% and 5.5% by weight of refractory.

While the invention has been described in considerable detail, I do not wish to be limited to the particular embodiments shown and described, and it is my intention to cover hereby all novel adaptations, modifications, and arrangements thereof which come from the practice of those skilled in the art and fall within the perview of the following claims.

I claim:

1. A new and improved refractory of controlled conductivity, consisting essentially of: essentially pure particles each having a crystalline oxide lattice of an element from the class consisting of, a Grup IV, Group V, or Group VI element, the lattice of said particles containing a dopant having a valence different from said element of said lattice and having an atomic radius sufficiently similar to that of the lattice forming element that it diffuses into said lattice without forming deposits at the grain boundaries between the particles and in an amount not appreciably exceeding the solubility of said dopant in said lattice, said refractory being generally devoid of Group I and II fluxing elements at the grain boundaries, and said particles being sintered together to form a refractory body.

2. The refractory of claim 1 wherein said lattice element is chromium and said dopant is from the class consisting of: titanium, zirconium, hafnium, vanadium, niobium, tantalum, molybdenum, wolfram, ruthenium, osmium, iridium, silicon, germanium, and tin.

3. The refractory of claim 1 wherein said lattice element is chromium and said dopant is titanium.

4. The refractory of claim 3 wherein said titanium comprises from 0.5% to approximately 5% by weight of the refractory.

5. The refractory of claim 1 wherein said lattice element is zirconium and said dopant is from the class consisting of: ruthenium, lithium, cobalt, sodium, rhodium, calcium, platinum, magnesium, palladium, scandium, nickel, yttrium, copper, chromium, zinc, manganese, cadmium, iron, and indium.

6. The refractory of claim 1 wherein said lattice element is zirconium and said dopant is manganese.

7. The refractory of claim 6 wherein said manganese comprises from .2% to approximately 5.9% by weight of the refractory.

8. The refractory of claim 1 wherein said lattice element is tin and said dopant is from the class consisting of: vanadium, niobium, tantalum, chromium, molybdenum, wolfram, bismuth, and uranium.

9. The refractory of claim 1 wherein said lattice element is tin and said dopant is niobium.

10. The refractory of claim 9 wherein said niobium comprises from .3% to approximately 5.5% by weight of the refractory.

11. The refractory of claim 1 wherein said lattice element is chromium and said dopant is tantalum.

12. The refractory of claim 11 wherein said tantalum comprises from .45% to approximately 5% by weight of the refractory.

13. The refractory of claim 1 wherein said lattice element is chromium and said dopant is niobium.

14. The refractory of claim 13 wherein said niobium comprises from 0.25% to approximately 5% by weight of the refractory.

15. A new and improved sintered granular body of controlled conductivity, consisting essentially of: essentially pure particles each having a crystalline oxide lattice of an element from the class consisting of, a Group IV, Group V, or Group VI element, the lattice of said particles containing a dopant having a valence different from said element of said lattice and having an atomic radius sufficiently similar to that of the lattice forming element that it diffuses into said lattice without forming deposits at the grain boundaries between the particles and in an amount not appreciably exceeding the solubility of said dopant in said lattice, said refractory being generally devoid of Group I and II fluxing elements at the grain boundaries, and said particles being sintered together to form a sintered granular body.

16. A method of producing refractory bodies having a desired electrical conductivity different from that of the basic refractory material at a given use temperature, said method consisting essentially of preparing a mixture of particles of an essentially pure refractory compound of predetermined lattice formation and a dopant therefor, said dopant being present in an amount not substantially exceeding the solubility of said dopant in said lattice at said use temperature; and sintering said mixture at a temperature sufficient to cause substantially all of said dopant to diffuse into the lattices of said particles of essentially pure refractory compound and to join said particles without leaving sufficient dopant at the boundaries between particles to appreciably interfere with the electrical properties of the doped particles.

17. The method of claim 16 wherein said basic refractory material is chromium oxide, and said dopant is one or more of the following materials: titanium, zirconium, hafnium, vanadium, niobium, tantalum, molybdenum, wolfram, ruthenium, osmium, iridium, silicon, germanium and tin.

18. The method of claim 17 wherein said dopant is titanium.

19. The method of claim 16 wherein said basic refractory material is tin oxide and said dopant is one or more of the following materials: vanadium, niobium, tantalum, chromium, molybdenum, wolfram, bismuth, and uranium.

20. The method of claim 19 wherein said dopant is niobium.

21. A new and improved refractory of controlled electrical conductivity consisting essentially of: refractory particles having a crystalline lattice of metallic and non-metallic elements and which at elevated temperatures become an n-type or p-type semiconductor; and a purposeful addition of a dopant having an atomic radius sufficiently similar to that of the metallic lattice forming element that it diffuses into said lattice without forming deposits at the grain boundaries between the particles and in an amount not appreciably exceeding the solubility of said dopant in said lattice to effectively alter the electrical conductivity of said crystalline lattice, said refractory being generally devoid of Group I and II fluxing elements at the grain boundaries, and said particles being sintered together to form a refractory body.

22. A new and improved refractory of controlled electrical conductivity consisting essentially of: refractory particles having a crystalline lattice of metallic and non-metallic elements and which at elevated temperatures become an n-type or p-type semiconductor; and a purposeful addition of a dopant having an atomic radius sufficiently similar to that of the metallic lattice forming element that it diffuses into said lattice without forming deposits at the grain boundaries between the particles and in an amount not appreciably exceeding the solubility of said dopant in said lattice, said dopant providing holes in the lattice in the case of an n-type semiconductor and providing free electrons in the case of a p-type semiconductor said refractory being generally devoid of Group I and II fluxing elements at the grain boundaries, and said particles being sintered together to form a refractory body.

* * * * *